(12) United States Patent
Mousseeff et al.

(10) Patent No.: US 10,788,008 B2
(45) Date of Patent: Sep. 29, 2020

(54) METHOD FOR OPTIMIZING THE ADJUSTMENT OF THE GATING OF AT LEAST ONE HYDRAULIC TURBINE

(71) Applicant: ELECTRICITE DE FRANCE, Paris (FR)

(72) Inventors: Olivier Mousseeff, Massieu (FR); Eric Hideux, Pierrevert (FR)

(73) Assignee: Electricite de France (FR)

( * ) Notice: Subject to any disclaimer, the term of this patent is extended or adjusted under 35 U.S.C. 154(b) by 81 days.

(21) Appl. No.: 16/315,427

(22) PCT Filed: Jul. 4, 2017

(86) PCT No.: PCT/EP2017/066644
§ 371 (c)(1),
(2) Date: Jan. 4, 2019

(87) PCT Pub. No.: WO2018/007390
PCT Pub. Date: Jan. 11, 2018

(65) Prior Publication Data
US 2019/0309723 A1 Oct. 10, 2019

(30) Foreign Application Priority Data

Jul. 5, 2016 (FR) ...................................... 1656403

(51) Int. Cl.
*F03B 3/18* (2006.01)
*F03B 15/04* (2006.01)

(52) U.S. Cl.
CPC .............. *F03B 3/183* (2013.01); *F03B 15/04* (2013.01); *F05B 2270/20* (2013.01); *F05B 2270/808* (2013.01); *Y02E 10/223* (2013.01)

(58) Field of Classification Search
CPC ...... F03B 3/183; F03B 15/04; F05B 2270/20; F05B 2270/808; Y02E 10/223
See application file for complete search history.

(56) References Cited

U.S. PATENT DOCUMENTS 3,236,498 A * 2/1966 Kerensky ................ F03B 3/183
290/43
3,613,721 A * 10/1971 Horn ....................... F03B 3/183
137/551

(Continued)

FOREIGN PATENT DOCUMENTS

FR 2300230 A1 * 9/1976 .............. F03B 3/183
GB 207448 A * 11/1923 .............. F03B 3/183

*Primary Examiner* — Igor Kershteyn
(74) *Attorney, Agent, or Firm* — Lerner, David, Littenberg, Krumholz & Mentlik, LLP

(57) ABSTRACT

The present invention relates to a method for optimizing the adjustment of the gating of a hydraulic turbine (1), the turbine (1) is provided with a set of wicket gates (2), wicket gates (2) are moving with a single, conjoined movement between a closing position in which they press against one another and an opening position in which they are apart from one another, by a control ring (4) that is kinematically connected to each one of these wicket gates (2), this control ring (4) being moved in rotation by at least one actuator (3), this actuator (3) including a device (31) for adjusting the travel of its rod (30), the method includes at least the following steps, the turbine (1) is previously stopped and dry and the rod (30) of the actuator (3) is provided with at least one strain gauge: 1) calculating the theoretical force to be applied to the actuator (3) in order to obtain watertight closure of the wicket gates (2); 2) measuring, via the strain gauge, the force applied to the actuator (3), the latter being inoperative; 3) after bringing the actuator (3) online, moving its rod (30) until the wicket gates (2) adopt the closing position and measuring the corresponding force, referred to as the "measured force"; 4) comparing the measured force with the theoretical force calculated in step 1.

5 Claims, 1 Drawing Sheet

(56) References Cited

U.S. PATENT DOCUMENTS

| | | | | |
|---|---|---|---|---|
| 5,346,359 | A | * | 9/1994 | Propst ................... F03B 3/183 29/407.05 |
| 6,846,154 | B2 | * | 1/2005 | Kuwabara ................ F03B 3/10 415/1 |

* cited by examiner

METHOD FOR OPTIMIZING THE ADJUSTMENT OF THE GATING OF AT LEAST ONE HYDRAULIC TURBINE

FIELD OF THE INVENTION

The present invention relates to a method for optimizing the adjustment of the gating of at least one hydraulic turbine.

TECHNICAL BACKGROUND OF THE INVENTION

The present invention is in the field of power generation by hydroelectric means.

In dams and in existing penstock installations, the power which is generated depends essentially on the pressure obtained thanks to the height of water retained by the dam, respectively pulled down in the interior of the penstock.

The obtaining of the height of water is ensured either by the retaining dam or by the creation of a water reservoir at altitude. The water passes through a turbine which drives an alternator producing electricity.

For reasons of safety which are easily understood, control and flow interruption devices are installed upstream of the turbines.

Hereafter reference is made to the appended FIG. 1 for explaining the structure and the operation of this control and interruption device.

In this figure, the device, which surrounds a turbine 1 which is not shown, is seen in front view.

The control and stopping device, also called in professional terms the "gating" or "gating device," is composed of blades 2 called "wicket gates," each of them being movable around its own axis 20 in a same conjoined movement which, when the wicket gates occupy their closing position (as shown in the figure), are pressed on each other (double arrow h).

This movement is made possible by the presence of a "gating ring," which in reality has the form of a ring 4, and which is kinematically connected to each of the wicket gates 2.

Thus, each of the wicket gates 2 is equipped with a crankpin 6, itself attached to one end of a tie rod 5. This tie rod is, for its part, hinged to the gating ring 4.

To facilitate the consultation of the appended figure, many tie rod/crankpin pairs are not shown.

Moreover, the gating ring 4 is associated with a pair of cylinders 3. They extend parallel to one another, are diametrically opposed and are mirror images of each other.

Their rod 30 has its articulated free end on the ring 4. Provided that the two cylinders 3 are actuated synchronously and in the same direction, this results in rotation of the gating ring 4 (see the double arrow g).

Said conjoined movement of the wicket gates 2 is then ensured by the following kinematic chain:

/cylinders 3 (arrow f) to gating ring 4 (arrow g) to tie rod 5 (arrow j) to crank pin 6 (arrow k) to wicket gate 2/(arrow h).

Of course, in other embodiments not shown here, only one of the two cylinders of FIG. 1 could be present, or a single cylinder provided with a spreader and with a single (or two) actuating arms.

Another alternative would be to have two cylinders, but not mounted in opposition (which then necessitates that when one extends its rod, the other one retracts its rod).

To ensure the integrity of the gating system and of the turbine 1, particularly of one or more wicket gates 2 are blocked by debris for example, the tie rods 5 have the function of serving as "mechanical fuses" and therefore to break beyond a limiting force.

To guarantee the water-tightness of the turbine 1 at the wicket gates 2, the builder of the turbine 1 imposes an overload on the gating system by applying excess movement to the control cylinder(s).

Thus, in the example illustrated here, the travel of the rod 30 of the cylinders 3 is adjustable and can be adjusted by a device 31 (for modifying the length of said rod) directly placed on the rod 30.

This overload causes premature wear of the wicket gates, crank pins and tie rods, which, at worst, can extend to the deterioration of the wicket gates and/or the rupture of the tie rods, which forces the operator to undertake considerable maintenance work.

The distributors of the hydraulic units are heavily loaded during starting and stopping phases.

Their functions are the following:

1. Adjustment of the Hydropower:

They manage the rotation until the hydraulic unit couples to the network. Moreover, they control the power of the unit from zero to full power.

2. Separation of Hydropower:

They separate the hydropower units and stop the units by normal or rapid closure, in a controlled time which is very strategic.

The rapid maneuver time of the distributor during an emergency stop caused by a safeguard must allow avoiding over-speeding the unit, while controlling the overpressure in the upstream water supply portion (impact of hydraulic safety on the penstock).

3. Isolation of the Hydropower:

The closed distributor must be sufficiently watertight to avoid having the units restart due to leakage.

When the units are stopped and they are not equipped with guard valves, the leaks generate water losses and therefore operating losses.

The forces of the control cylinder(s) must be sufficient to hold the gating closed and oppose the hydrostatic pressure which tends to open it.

The maneuvering and closure forces of the distributor are therefore strategic because they must not generate premature wear over all or a portion of the kinematic chain which could cause abnormal friction causing a deviation in the maneuver time and perturbing the water-tightness of the gating system of the unit when stopped.

The present invention aims to mitigate this difficulty.

SUMMARY OF THE INVENTION

Thus, the present invention relates to a method for optimizing the adjustment of the gating of at least one hydraulic turbine, this turbine being provided with a series of wicket gates, these wicket gates being movable in a same conjoined movement, between a closure position in which they are pressed two by two on each other and an opening position in which they are distant from each other, via a gating ring which is kinematically connected to each of these wicket gates, this gating ring being itself moved in rotation around itself by at least one cylinder, this cylinder including a device for adjusting the travel of its rod, characterized by the fact that it includes at least the following steps, said turbine being previously stopped and drained of water and the rod of said cylinder being provided with at least one strain gauge:

1/ Calculation of the theoretical force to be applied to said cylinder to obtain a watertight closure of said wicket gates;

2/ Measurement, via said strain gauge, of the force applied to said cylinder, the latter being out of operation;

3/ After the startup of said cylinder, movement of its rod until said wicket gates occupy said closure position and measurement of the corresponding force, called the "measured force";

4/ Comparison of the measured force to the theoretical force calculated in step 1/;

5/ Shutdown of said cylinder if a difference is observed between the two forces upon completion of step 4/;

6/ Modification of the travel of the rod of said cylinder by means of said adjustment device;

7/ After actuation of said wicket gates to make them occupy said opening position, repetition of steps 3/ to 6/ as long as the measured force has not reached the theoretical force.

The adjustment of the preload makes it possible to oppose the hydrostatic pressure of the closed gating system, without excess strains and deformations which could cause excessive wear.

The optimization of the adjustment of the preload also allows:
  eliminating frequent breakage of fuse members;
  increasing the productivity of units by reducing the frequency of maintenance operations;
  limiting water losses by reducing leakage and therefore operating losses;
  ensuring the continuity of maneuvering forces and therefore of the closure time with respect to hydraulic safety.

Moreover, according to other nonlimiting and advantageous features of this method:
  when using fusible tie rods between said wicket gates and said gating ring, then these tie rods are also provided with at least one strain gauge;
  it comprises a final testing step in which steps 3/ to 5/ are repeated while said turbine is in operation;
  using at least one shim or at least one screw/nut system by way of a device for adjusting the rod of said cylinder.
  it is implemented via a program loaded into a computer.

BRIEF DESCRIPTION OF THE DRAWINGS

Other features and advantages of the invention will appear upon reading the following description of a preferred embodiment of the invention. This description is made with reference to the appended drawings in which:
  as indicated above.

DETAILED DESCRIPTION OF THE INVENTION

Figure 1:
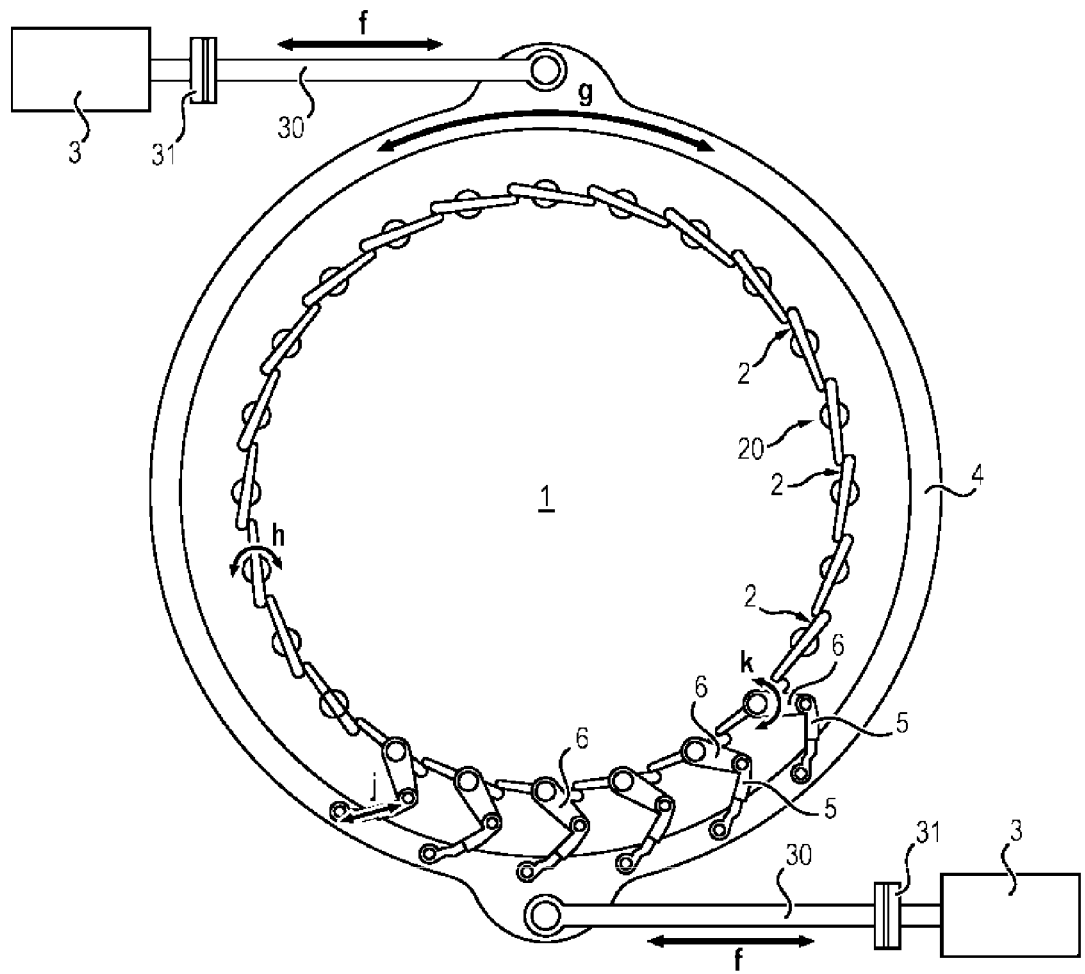
FIG. 1 is a schematic view of the front of an adjustment and interruption device of a hydraulic turbine to which the method according to the present invention can be applied.

To be described hereafter is an embodiment of the method according to the invention with reference to FIG. 1 already mentioned above.

The first of the distinctive steps (i.e. step 1/ mentioned above) of this method consists of calculating the theoretical force to be applied to the cylinder(s) 3 to obtain a watertight closure of the wicket gates 2.

The calculation of the theoretical force is accomplished by mechanics of statics in a calculation file which takes into account the different technologies of existing gating. This file must be informed of various characteristics which will be the subject of paragraphs a), b), c) and d) explained below.

The transmission of forces is accomplished according to two principles, namely transmission of forces linearly or by torque.

The rods and tie rods 5 transmit a linear force. They have a connection to other parts, to which they are connected by an articulation axis at each of their ends.

On the other hand, the spreader, gating ring 4 and crank pins 6 perform a rotational movement and transmit force in the form of a torque.

Thus, by way of an example, each cylinder 3 (of FIG. 1) and their associated rod 30 transmit a linear force to the gating ring 4. The latter transmits a torque which is transformed into a linear force on the tie rods 5 which, for their part, transmit it to the crank pins 6, which, finally, transmit a torque in their turn to the wicket gates 2.

Certain dimensions and certain angles of these parts are determined by projection in a drafting program and by trigonometric calculations.

These angles are in fact necessary for the calculation of torque transmission.

This is particularly the case of the cylinders 3 with respect to the gating ring 4 (likewise between the ring 4 and the tie rod 5 and between the tier rod 5 and the crank pin 6).

They allow the determination of the tangential radius, that is the minimum real radius of application of force, in other words the length of the segment perpendicular at one end to the force and at the other end at the center of rotation of the part concerned.

The calculation of torque is accomplished by the product of the tangential radius of application of the force and the value of said force. The force is then expressed in meter-decaNewtons (m·daN). Thus a torque of 1 m·daN is the result of a force of 1 daN at a radius of 1 meter.

The aforementioned characteristics are the following:
  a) Control Stroke:
    Minimum pressure of the hydraulic control system of the cylinder(s);
    Dimensions of the surface areas of the pistons subjected to the hydraulic pressure of the cylinder(s);
    $F = P \times S$ with:
    F=force in deca Newtons;
    P=Pressure in bars;
    S=Surface area of the pistons in $m^2$.
  b) Determination of the Control Torque for Closing the Wicket Gates:
    Dimensions of the different interlinked parts, forming the kinematic force transmission chain from the cylinder 3 to the wicket gates 2.
    Geometric positions of certain parts;
    Angles in degrees between the parts transmitting to each other forces transformed into torques;
    Radii in meters for parts transmitting a torque 4.
    Specific portions need to be provided information depending on the different technologies, and particularly depending on the presence of a spreader, on the number of associated arms and on the number of cylinders 3.
  c) Determination of the Torque to which are Subjected the Wicket Gates Under the Pressure of the Water (Hydrostatic Thrust):
    Height H of net maximum head (expressed in meters) of the installation for the purpose of knowing the hydrostatic pressure P, expressed in bars.

Geometries of the wetted surface areas of the wicket gates subjected to hydrostatic pressure, namely:

$S1 = R1 \times H$ where R1 is the radius of the leading edge and where the surface area is expressed in $m^2$;

$S2 = R2 \times H$, where R2 is the radius of the trailing edge and where the surface area is expressed in $m^2$;

$F = P \times (S1-S2)$, residual force (in daN) which has the effect of opening (if $S1 < S2$) or closing (if $S1 > S2$) the wicket gates. Of course, $F=0$ when $S1=S2$;

$Rm = (R1-R2)/2$, medium radius of application of F, in meters;

$C = F \times Rm$, hydrostatic torque (in m·daN) which has the effect of opening or closing the wicket gates depending on whether $S1 < S2$ or $S1 > S2$.

d) Necessary Preload:

The preceding characteristics being provided, an automatic calculation allows the determination of the preload forces which will need to be applied upon closure by the tie rods 5 of the cylinder(s) 3 to the ring 4, depending on the accuracy of said method. This automatic calculation compares the closure torque to the hydrostatic torque and applies a margin with an adjustment tolerance.

Once this theoretical calculation is performed, the implementation of the second step of the method is initiated, namely the measurement, via a strain gauge, of the force applied to said at least one cylinder with which the turbine is equipped, this cylinder being out of service.

Figure 2:
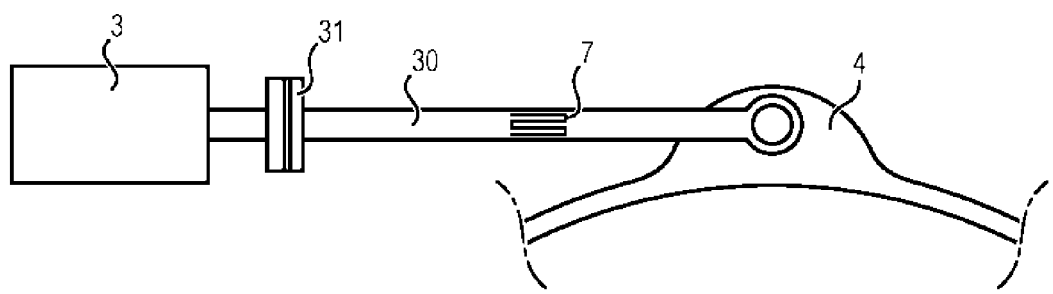
FIG. 2 is a schematic showing a cylinder of the installation of FIG. 1 which is equipped with a strain gauge.

As shown in FIG. 2, this gauge 7 is placed on the rod 30 of each cylinder 3. By way of indication, a bidirectional gauge such as that marketed by the HBM company under reference number 1XY31-6/350 or by the VISHAY MICROMESURE company under reference number 06-CEA-125UT-350 is completely suitable.

This method therefore comprises instrumentation with deformation gauges 7, so as to measure the forces in the rod 30 and the connection members of each cylinder 3 of the gating ring 4.

The measurement of the control pressures of the servomotor of the cylinders 3 and the measurement of their movements allows assurance of the proper operation thereof and verification that the preload applied actually corresponds to the correct power of the cylinders.

More precisely, the control and the adjustment of the preload are accomplished as follows, after the installation of at least one strain gauge 7 on the rod 30 of each cylinder and, in case of necessity, on the fusible tie rods 5:

a. stopping the installation, the machine being drained of water;

b. Optimal control and/or adjustment of the closure of the wicket gates 2, i.e. in contact with one another;

c. Measurement without load, via the strain gauge 7, of the force applied to each cylinder 3, the latter not applying any force;

d. Restarting hydraulic control of the cylinder(s) 3;

e. After restart of said cylinder 3, movement of its rod 30 until the wicket gates 2 occupy their closure position, and measurement of the corresponding force. This force is called the "measured force";

f. Comparison of this measured force with the theoretical force measured previously;

g. Stopping the hydraulic control of each cylinder 3 and out-of-operation thereof if a difference is observed between these two forces;

h. Modification of the travel of the rod 30 of each cylinder 3 by means of the adjustment device 31 (this device 31 can comprise at least one shim or a screw/nut system);

i. After actuation of said wicket gates 2 to cause them to occupy their opening position, repetition of steps e) and subsequent as long as said measured force has not reached the theoretical force.

A final testing step consists of repeating said steps e) to g) when said turbine 1 is in operation.

Preferably, a computer allows the interpretation of the measurement of forces for comparison to the theoretical force calculation file.

The implementation of the method of the present invention offers in particular the following advantages:

Adjustment of the closure forces to the strictly necessary value.

Accurate, direct measurement of the preload value corresponding to the position of the closed gating ring.

Measurement of forces due to friction during maneuvers.

Measurement in water under real hydraulic thrust and verification of the attainment of optimum results.

Distribution of forces in each control element (in the case where several maneuvering arms are used).

The present invention applies to all hydroelectric turbines, whether of the FRANCIS, KAPLAN, bulb type, propeller type or reversible (meaning that it can operate as a turbine or as a pump).

This methodology can be applied to units of all power levels and to all heads.

When the method is applied to one or the other of the turbines above, the following advantages are obtained:

Productivity gain;

Reduction in maintenance

Lifetime increase in wearing and guidance parts;

Control of forces in the kinematic chain;

Improved reliability of operation of the kinematic chain over time and, as a result, of the maneuvering times (hence a positive impact on hydraulic safety);

Reduction in the wear of guard valves by better balancing of pressure prior to maneuver thereof (the water-tightness of the gating impacts the balancing pressure in the zone comprised between the valve and the gating).

The invention claimed is:

1. A method for optimizing the adjustment of the gating of at least one hydraulic turbine, said turbine being provided with a series of wicket gates, said wicket gates being movable in a same conjoined movement, between a closure position in which they are pressed two by two on each other and an opening position in which they are distant from each other, via a gating ring which is kinematically connected to each of said wicket gates, said gating ring being itself moved in rotation around itself by at least one cylinder comprising a rod, said cylinder including a device for adjusting the travel of its rod, wherein it includes at least the following steps, said turbine being previously stopped and drained of water and the rod of said cylinder being provided with at least one strain gauge:

1) calculation of the theoretical force to be applied to said cylinder to obtain a watertight closure of said wicket gates;

2) measurement, via said strain gauge, of the force applied to said cylinder, the latter being out of operation;

3) after the startup of said cylinder, movement of its rod until said wicket gates occupy said closure position and measurement of the corresponding force, called the measured force;

4) comparison of the measured force to the theoretical force calculated in step 1;

5) shutdown of said cylinder if a difference is observed between the two forces upon completion of step 4;
6) modification of the travel of the rod of said cylinder by means of said adjustment device;
7) after actuation of said wicket gates to make them occupy said opening position, repetition of steps 3 to 6 as long as said measured force has not reached the theoretical force.

2. The method according to claim 1 wherein fusible tie rods are used between said wicket gates and said gating ring, and wherein these tie rods are also provided with at least one strain gauge.

3. The method according to claim 1, wherein it includes a final testing step in which steps 3 to 5 are repeated while said turbine is in operation.

4. The method according to claim 1, wherein at least one shim or at least one screw/nut system is used by way of a device for adjusting the travel of the rod of said cylinder.

5. The method according to claim 1, wherein it is implemented via a program loaded into a computer.

* * * * *